United States Patent Office 3,576,638
Patented Apr. 27, 1971

3,576,638
HIGH MOLECULAR WEIGHT, LONG CHAIN TETRAZOLE-CONTAINING POLYMERS FOR ANTIFOGGING USE IN PHOTOGRAPHIC ELEMENTS
Richard C. Tuites, Thomas E. Whiteley, and Louis M. Minsk, Rochester, N.Y., assignors to Eastman Kodak Company, Rochester, N.Y.
No Drawing. Filed Oct. 9, 1967, Ser. No. 673,914
Int. Cl. G03c 1/34
U.S. Cl. 96—109                     14 Claims

ABSTRACT OF THE DISCLOSURE

Novel, high molecular weight long-chain polymers comprising recurring tetrazole moieties incorporated into the polymer chain or appended from the polymer backbone are disclosed as having antifoggant and emulsion stabilization use. A photographic silver halide emulsion and a photographic element comprising said emulsion each comprising said high molecular polymers in a concentration sufficient to fog stabilize and protect said emulsion are disclosed.

BACKGROUND OF THE INVENTION

Field of the invention

This invention relates to new polymers. In one aspect it relates to polymers useful as improved antifoggants and fog stabilizers for photographic use. In another aspect it relates to photographic elements and photographic silver halide emulsions containing said polymers as antifoggants and fog stabilizers therein.

Description of the prior art

During development of a silver halide emulsion, small amounts of silver halide are reduced to metallic silver regardless of whether or not they have been exposed. This reduction of silver ion produces a background fog which is more specifically referred to as chemical fog.

Chemical fog, apparent in most silver halide systems, has eben lessened by prior art methods of processing exposed silver halide material in the presence of compounds which restrict development of unexposed silver halide. Such compounds can be incorporated in the silver halide emulsion. Compounds which have a chemical fog inhibiting effect on emulsions subjected to conditions of high temperature and humidity are referred to as emulsion stabilizers. On the other hand, compounds having chemical fog inhibiting effects on emulsions not exposed to adverse storage conditions are referred to as antifoggants. Although a large number of emulsion stabilizers and antifoggants are disclosed in the prior art, many of these compounds also cause undesirable losses in emulsion speed and contrast while other lack adequate compatibility with gelatin emulsions.

SUMMARY OF THE INVENTION

One subject of the present invention is to provide novel polymers containing tetrazole moieties incorporated into the polymer chain or appended from the polymer backbone.

Another object of this invention is to provide polymers containing tetrazole moieties having utility as antifoggants and fog stabilizing agents in photographic use.

Still another object of this invention is to provide novel polymeric compounds which prevent the growth of incubation fog when incorporated into photographic elements and photographic emulsions.

Still another object of this invention is to provide high molecular long chain, weight polymers comprising tetrazole moieties which exhibit fog-stabilizing properties and which are non-migratory, that is, they substantially restrict their activity to the substance with which they are contacted.

Other objects will become apparent to those skilled in the art from a reading of the disclosure and the claims as hereafter set forth.

DESCRIPTION OF PREFERRED EMBODIMENTS

According to one embodiment of this invention, there is provided a new class of polymers containing recurring tetrazole moieties, which tetrazole moieties are attached to the polymer at least through the nuclear carbon atom thereof. When the tetrazole moieties are appended from the polymeric backbone, they are monovalent and are attached to the polymeric backbone only through the nuclear carbon atom of the tetrazole moieties. However, when the tetrazole moieties are incorporated into the polymeric backbone, they are divalent and are attached to said backbone through one of the nuclear nitrogen atoms as well as through the nuclear carbon atom.

According to another embodiment of this invention, there is incorporated into the silver halide emulsion of a photographic element or in a layer contiguous to the silver halide emulsion, a fog-stabilizing amount of a polymer containing recurring tetrazole moieties. The polymer stabilizes the emulsion against fog without adversely affecting other sensitometric properties when the dried emulsion has been subjected to an incubation period of prolonged high humidity and temperature. The tetrazole moiety contains a tetrazole ring which can contain substituents such as alkyl, aryl, cycloalkyl or the like. When this moiety is in the polymeric side chain, the tetrazole ring in the moiety can be linked directly to the polymer backbone or it can be linked through suitable atoms or groups such as carbon, sulfur, thiamethyl, and the like. A preferred group of polymers in accordance with this invention has a tetrazole moiety incorporated into the polymer chain or backbone. Polymers of this group contain repeating segments having the formula

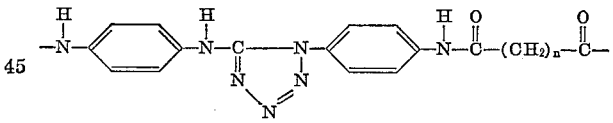

wherein $n$ is an integer of 0 to 10. Such polymers may be prepared by reacting 1-(4-aminophenyl)-5-(4-aminoanilino)-tetrazole with a dicarboxylic dihalide in an inert solvent.

Another preferred group of polymers has the tetrazole moiety appended from the polymeric backbone. These polymers contain repeating segments having formulae selected from the group consisting of

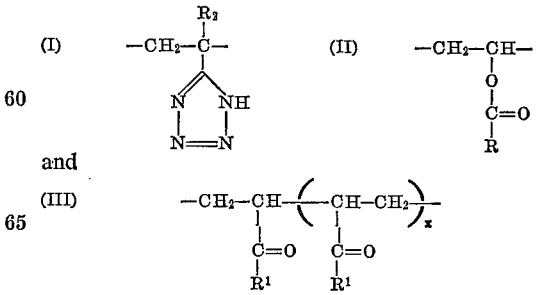

wherein X is 0 or 1, R is a tetrazole moiety, each $R^1$ is a tetrazole moiety or a photographically inert group, at least 25 percent of said $R^1$ substituents in said polymer being tetrazole moieties, $R_2$ is hydrogen or a methyl group and said polymer being characterized by its ability to stabilize a photographic silver halide emulsion against fog.

Polymers containing repeating segments having the formula

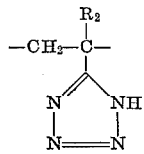

as defined herein, can be conveniently prepared by reacting polyacrylonitrile or polymethacrylonitrile with an azide such as sodium azide in the presence of ammonium chloride. Polymers containing repeating segments having the formula

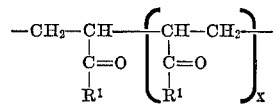

can be prepared by reacting a tetrazole which is substituted with a functional group, such as a sodium salt of a sulfhydryl, (for example 1-phenyl-5-mercapto-1-H tetrazole sodium salt), with a polymer containing reactive groups, such as anhydride or ester groups. When the intermediate polymer is one which contains anhydride groups, such as copoly(styrene-maleic anhydride) or poly(acrylic anhydride), at least half of the $R^1$ groups in the above formula will be hydroxy groups. Intermediate polymers having inherent viscosities of up to 1.5 are preferred.

The polymeric tetrazoles of this invention can be incorporated into a photographic element in a silver halide emulsion or contiguous thereto such as in a layer in any amount which will stabilize the silver halide emulsion against fog. In general, a concentration of the polymeric tetrazole of from about 0.12 to about 50.0, preferably about 0.12 to about 27.0 grams per mole of silver in the silver halide emulsion can be used with good results.

The preparation of photographic silver halide emulsions such as are suitably stabilized with a polymeric tetrazole typically involves three separate operations: (1) emulsification and digestion of silver halide, (2) the freeing from the emulsion of excess water-soluble salts, suitably by washing with water, and (3) the second digestion or "after-ripening" to obtain increased emulsion speed or sensitivity. (Mees, "The Theory of the Photographic Process," 1954). The polymeric tetrazole can be added to the emulsion before the final digestion or after-ripening or it can be added immediately prior to the coating.

The silver halide emulsion of a photographic element containing the antifoggants and fog stabilizers of this invention can contain conventional addenda such as gelatin plasticizers, coating aids, and hardeners such as aldehyde hardeners, e.g., formaldehyde, mucochloric acid, glutaraldehyde bis(sodium bisulfite), maleic dialdehyde, aziridines, dioxane derivatives and oxypolysaccharides. Spectral sensitizers which can be include the cyanines, merocyanines, complex (trinuclear) cyanines, complex (trinuclear) merocyanines, styryls, and hemicyanines. Sensitizing dyes useful in sensitizing such emulsions are described, for example in U.S. Pats. 2,526,632 of Brooker and White issued Oct. 24, 1950, and 2,503,776 of Sprague issued Apr. 11, 1950. Developing agents can also be incorporated into the silver halide emulsion if desired or can be contained in a contiguous layer. Various silver salts can be used as the sensitive salt such as silver bromide, silver iodide, silver chloride, or silver halides such as silver chlorobromide or silver bromoiodide. The silver halides used can be those which form latent images predominantly on the surface of the silver halide grains or those which form latent images inside the silver halide crystals such as described in U.S. Pat. 2,592,250 of Davey and Knott issued Apr. 8, 1952.

The silver halide emulsion layer of a photographic element containing the antifoggants and fog stabilizers of the invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Pats. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith, and Yudelson issued Nov. 30, 1965; and include the water-insoluble polymers of alkyl acrylates and methacrylates, acrylic acid, sulfoalkyl acrylates or methacrylates and the like.

The silver halide emulsion of a photographic element containing the antifoggants and fog stabilizers of the invention can be coated on a wide variety of supports. Typical supports are cellulose nitrate film, cellulose ester film, polyvinyl acetal film, polystyrene film, poly(ethylene terephthalate) film and related films or resinous materials as well as glass, paper, metal and the like. Supports such as paper which are coated with α-olefin polymers, particularly polymers of α-olefins containing two or more carbon atoms, as exemplified by polyethylene, polypropylene, ethylene-butene copolymers and the like can also be employed.

The speed of the photographic emulsions containing the antifoggants and fog stabilizers of the invention can be further enhanced by including in the emulsions a variety of hydrophilic colloids such as carboxymethyl protein of the type described in U.S. Pat. 3,011,890 of Gates, Jr., Miller and Koller issued Dec. 5, 1961, and polysaccharides of the type described in Canadian Pat. 635,206 of Koller and Russell issued Jan. 23, 1962.

Photographic emulsions containing the antifoggants and fog stabilizers of the invention can also contain speed-increasing compounds such as quaternary ammonium compounds, polyethylene glycols or thioethers. Frequently, useful effects can be obtained by adding the aforementioned speed-increasing compounds to the photographic developer solutions instead of, or in addition to, the photographic emulsions.

Photographic elements containing the antifoggants and fog stabilizers of the instant invention can be used in various kinds of photographic systems. In addition to being useful in X-ray and other non-optically sensitized systems, they can also be used in orthochromatic, panchromatic and infrared sensitive systems. The sensitizing addenda can be added to photographic systems before or after any sensitizing dyes which are used.

Silver halide emulsions containing the antifoggants and fog stabilizers of the invention can be used in color photography, for example, emulsions containing color-forming couplers or emulsions to be developed by solutions containing couplers or other color-generating materials, emulsions of the mixed-packet type such as described in U.S. Pat. 2,698,794 of Godowsky issued Jan. 4, 1955; in silver dye-bleach systems; and emulsions of the mixed-grain type such as described in U.S. Pat. 2,592,243 of Carroll and Hanson issued Apr. 8, 1952.

Silver halide emulsions containing the antifoggants and fog stabilizers of the invention can be sensitized using any of the well-known techniques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

Silver halide emulsions containing the antifoggants and fog stabilizers of the invention can be used in diffusion transfer processes which utilize the undeveloped silver halide in non-image areas of the negative to form a positive by dissolving the undeveloped silver halide and precipitating it on a silver layer in close proximity to the original silver halide emulsion layer. Such processes are described in U.S. Pat. 2,352,014 of Rott issued June 20, 1944; 2,543,181 of Land issued Feb. 27, 1951; and 3,020,155 of Yackel, Yutzy, Foster and Rasch issued Feb. 6, 1962. The emulsions can also be used in diffusion transfer color processes which utilize a diffusion transfer of an imagewise distribution of developer, coupler or dye, from a light-sensitive layer to a second layer, while the two layers are in close proximity to one another. Silver halide emulsions containing the antifoggants of the invention can be processed in stabilization processes such as the ones described in U.S. Pat. 2,614,927 of Broughton and Woodward issued Oct. 21, 1952, and as described in the article "Stabilization Processing of Films and Papers" by H. D. Russell, E. C. Yackel and J. S. Bruce in P.S.A. Journal, Photographic Science and Technique, volume 16B, October 1950.

The antifoggants and fog stabilizing agents of this invention can be advantageously incorporated during manufacture in silver halide emulsions representing the variations described above. Moreover, fog control and fog stability can be achieved in binderless silver halide films prepared by vapor deposition of silver halide on a suitable support by coating the antifoggant and fog stabilizing agents of the invention over the vapor deposited layer of silver halide.

Combinations of all the above-mentioned addenda can be used if desired.

The following examples illustrate the best modes contemplated for carrying out this invention; although it will be understood that these examples are included merely for purposes of illustration and are not intended to limit the scope of the invention.

EXAMPLE I

To a solution of 1-(4-aminophenyl)-5-(4-aminoanilino)-tetrazole (4.5 g., about 0.015 mole of non-purified material) and triethylamine (4.5 g., 0.045 mole) in 25 ml. of dimethylacetamide there is added rapidly with stirring, under nitrogen, a solution of adipyl chloride (2.75 g., 0.015 mole) in 25 ml. of dimethylacetamide. A highly exothermic reaction takes places and a white gas fills the flask. The reaction mixture is stirred under nitrogen at ambient conditions for 24 hours. An insoluble solid is filtered off, washed with ether and dried in a vacuum oven at 30–35° C. overnight. Approximately 3.6 g. (about 88 percent theoretical) of a white solid is obtained. The solid is soluble in water, gives a positive test for active halogen with silver nitrate solution and gives an infrared spectrum identical to that of triethylamine hydrochloride. The desired polymer is precipitated by pouring the filtrate into ether. The resulting solid is washed with additional ether, then with water and dried in a vacuum oven at 35–40° C. overnight. Yield of yellow solid is 2.4 g. (about 89 percent theoretical).

*Anaylsis.*—Found (percent): C, 58.9; H, 6.0; N, 20.5.

The inherent viscosity in dimethyl formamide is 0.24. The infrared spectrum of the product shows the presence of an amide carbonyl absorption at 1667 cm.$^{-1}$, as well as a strong doublet absorption between 1600–1650 cm.$^{-1}$ (also present in the starting diamine and presumably associated with the tetrazole ring) and aliphatic C–H absorption at 2950 cm.$^{-1}$. The product consists essentially of repeating segments having the formula

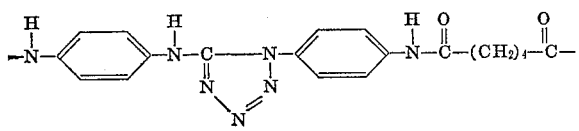

The product is dissolved in a mixture of 6 parts of dimethylformamide and 1 part of water, and subjected to photographic testing as described hereinafter.

EXAMPLE II

To a solution of polymethacrylonitrile having an inherent viscosity in acetone of about 0.1 (26.8 g., 0.4 mole) in 200 ml. of dimethylformamide are added sodium azide (28.6 g., 0.44 mole) and ammonium chloride (23.5 g., 0.44 mole). The mixture is heated without stirring for 20–24 hours at 100° C. in air. The solution in dimethylformamide turns red during the course of the heating period. The product is precipitated into about 3 liters of 1–2 percent sulfuric acid, washed very well with water and dried in a vacuum oven at 40° C. overnight. The yield of light tan solid is about 32 g.

*Analysis.*—Found (percent): C, 54.6; H, 6.9; N, 39.1.

The analytical results are consistent for a product containing about 60 percent of the theoretical amount of the tetrazole ring. The infrared spectrum shows a small —C≡N band at about 2260 cm.$^{-1}$ plus strong absorption at 1640 and 1540 cm.$^{-1}$. The product contains repeating segments having the formula

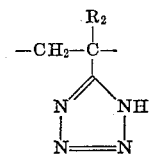

wherein $R_2$ is methyl. The product is dissolved in a mixture of 4 parts of water and 1 part of acetone by adding 10 percent sodium hydroxide. The solution is adjusted to a pH of 6.2 by adding additional sodium hydroxide and subjected to photographic testing as hereinafter described.

EXAMPLE III

To a solution of poly(acrylic anhydride) having an inherent viscosity in dimethyl formamide of 0.23 (12.6 g., 0.1 mole) in 200 ml. of dimethyl formamide is added 1-phenyl - 5 - mercapto - 1H - tetrazole sodium salt (20.0 g., 0.1 mole). The reaction mixture is stirred under nitrogen for 3–4 hours at 75° C. The mixture turns very dark shortly after the addition of the sodium salt. The product is precipitated into 2 liters of acetone and filtered. The starting sodium salt is soluble in acetone. The product is dried in a vacuum oven at 40–50° C. over a weekend. Yield of brown solid is 15 g.

*Analysis.*—Found (percent): C, 51.3; H, 5.8; N, 6.2, 5.8; S, <2; Na, 3.9, 3.9.

The N and Na analyses are consistent with a product containing about 35–55 percent of the theoretical amount of tetrazole off the polymer chain. The product contains recurring segments having the formulae

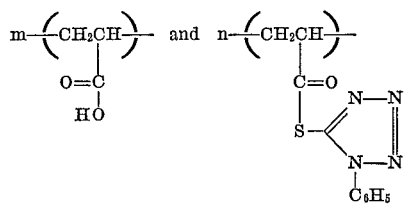

wherein the ratio of the values of $m$ to $n$ is about 4:1. The product is dissolved in water, pH adjusted to 6.2 with ten percent sodium hydroxide and subjected to photographic testing as described hereinafter.

EXAMPLE IV

The process of Example III is repeated substituting for the poly(acrylic anhydride) an equimolar amount of copoly(ethylene-maleic anhydride) having an inherent viscosity in dimethyl formamide of 0.82. The product contains repeating segments having the formula

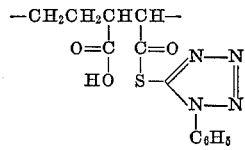

Analysis of the product for nitrogen indicates that the product contains about 15 percent of the theoretical amount of tetrazole groups off the polymer chain.

EXAMPLE V

A commercial grade of polyvinyl alcohol (Elvanol 70–05) having an inherent viscosity in water of about 0.4 is reacted with chloroacetic anhydride to obtain poly(vinyl chloroacetate). To a solution of the poly(vinyl chloroacetate) (12.0 g., 0.1 mole) in 200 ml. of dimethylformamide is added 1 - phenyl - 5 - mercapto-1H-tetrazole sodium salt (20.0 g., 0.1 mole). The reaction mixture is heated at 70° C. under nitrogen for 24 hours. Solid, presumably sodium chloride, begins to precipitate out of solution as soon as the two reactants are mixed. The product is precipitated by pouring the reaction mixture into 2 liters of water. It is then washed with additional water and dried in a vacuum oven at 40° C., over a weekend.

*Analysis.*—Found (percent): C, 49.3; H, 4.2; N, 20.1; S, 11.7.

The N and S analyses are consistent with a product having about 95 percent of the theoretical amount of tetrazole off the polymer chain. The product contains repeating segments having the formula

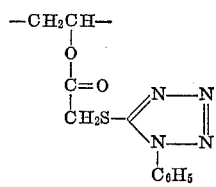

The product is dissolved in a 1:1 mixture of dimethyl formamide and acetone and the solution is subjected to photographic testing as hereinafter described.

EXAMPLE VI

The process of Example V is repeated using a poly(vinyl chloroacetate) having a molecular weight of between about 3000 and 4000. Analysis of the product for nitrogen indicates that it contains about 91 percent of the theoretical amount of tetrazole groups off the polymer chain.

Each of the polymers prepared in Examples I to VI is added to separate portions of a high speed silver bromoiodide emulsion. For purposes of comparison, high speed silver bromoiodide emulsions are also prepared incorporating the hydrolysis products of intermediate polymers of the types used in preparing the polymers of this invention—i.e., polyacrylic acid obtained by hydrolysis of polyacrylic anhydride having an inherent viscosity in dimethyl formamide of 0.79 and copoly(ethylenemaleic acid) obtained by hydrolysis of copoly(ethylene-maleic anhydride) having an inherent viscosity in dimethyl formamide of 0.13. Each emulsion sample is coated on a cellulose acetate film support at a coverage of 459 mg. of silver and 1040 mg. of gelatin per square foot. A sample of each film coating is exposed on an intensity scale sensitometer, processed for five minutes in Kodak Developer DK–50, fixed, washed and dried. The photographic results obtained from these tests are listed in the table below.

TABLE

| Compound of— | g./mole Ag | Fresh | | | Incubation at 120° F. and 50% relative humidity for 2 weeks | | |
|---|---|---|---|---|---|---|---|
| | | Relative Speed | Gamma | Fog | Relative Speed | Gamma | Fog |
| Control | | 100 | 1.35 | 0.15 | 31 | 0.68 | 0.91 |
| Example 1 | 0.12 | 83 | 1.15 | 0.10 | 27 | 0.60 | 0.74 |
| Control | | 100 | 1.38 | 0.16 | 58 | 0.87 | *0.54 |
| Example 2 | 3.0 | 83 | 1.28 | 0.10 | 80 | 1.07 | 0.14 |
| Control | | 100 | 1.30 | 0.17 | 37 | 0.87 | 0.70 |
| Example 3 | 0.3 | 74 | 1.15 | 0.15 | 55 | 1.08 | 0.20 |
| Control | | 100 | 1.33 | 0.10 | 65 | 1.00 | *0.35 |
| Example 4 | 9.0 | 69 | 1.30 | 0.10 | 45 | 1.07 | 0.33 |
| Control | | 100 | 1.53 | 0.10 | 17.2 | 0.58 | 1.16 |
| Example 5 | 3.0 | 91 | 1.47 | 0.07 | 32.5 | 0.98 | 0.74 |
| Control | | 100 | 1.27 | 0.14 | 33 | 0.75 | 0.81 |
| Example 6 | 27.0 | 45 | 1.13 | 0.07 | 8.0 | 0.55 | 0.63 |
| Control | | 100 | 1.67 | 0.16 | 48 | 0.95 | *0.47 |
| Polyacrylic acid | 18.0 | 110 | 1.65 | 0.20 | 35.5 | 0.85 | *0.83 |
| Copoly(ethylene maleic acid) | 45.0 | 123 | 1.62 | 0.24 | | | *>1.0 |

*1-week incubation instead of 2-week incubation.

The results in the above table shows that the compounds of this invention prevent the growth of incubation fog when incorporated in photographic emulsions but that polymers which do not contain the tetrazole nucleus either are inert or cause fog in photographic emulsions. Moreover, wandering of the antifoggant and fog stabilizers of this invention is minimized or eliminated. That is, their activity is restricted to the substance with which they are contacted, such as, for example, a particular photographic emulsion layer.

Although the invention has been described in considerable detail with reference to certain embodiments thereof, it will be understood that variations and modifications can be effected without departing from the spirit and scope of the invention as described hereinabove and as defined in the appended claims.

We claim:

1. A composition comprising a photographic silver halide emulsion containing a fog-stabilizing amount of a high molecular weight long chain polymer containing recurring tetrazole moieties.

2. The composition of claim 1 wherein said high molecular weight polymer is present in an amount of from about 0.12 to about 27.0 grams per mole of silver in said silver halide emulsion.

3. A composition comprising a photographic silver halide emulsion containing a fog-stabilizing amount of a high molecular weight long chain polymer containing tetrazole moieties, said moieties being attached to said polymer at least through the nuclear carbon atom contained in said tetrazole moiety.

4. A composition comprising a photographic silver halide emulsion containing a fog-stabilizing amount of the high molecular weight long chain polymer having repeating segments having the formula

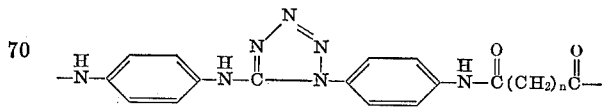

wherein $n$ is an integer of from 0 to 10, said polymer being characterized by its ability to stabilize a photographic silver halide emulsion against fog.

5. A composition comprising a photographic silver halide emulsion containing a fog-stabilizing amount of a high molecular weight long chain polymer containing repeating segments having the structural formulae selected from the group consisting of:

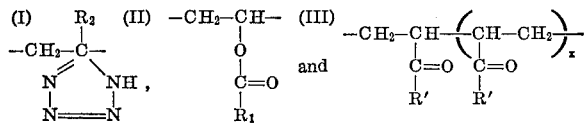

wherein X is 0 or 1, $R_1$ is a tetrazole moiety, each R' is a tetrazole moiety or a photographically inert group, at least 25 percent of said R' substituents in said high molecular weight polymer being tetrazole moieties and $R_2$ is a methyl group or hydrogen, said polymer characterized by its ability to stabilize a photographic silver halide emulsion against fog.

6. A composition comprising a photographic silver halide emulsion containing a fog-stabilizing amount of the high molecular weight long chain polymer of claim 5 wherein said repeating segment have the formula

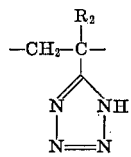

wherein $R_2$ is a methyl group or hydrogen.

7. A composition comprising a photographic silver halide emulsion containing a fog-stabilizing amount of the high molecular weight long chain polymer of claim 5 having repeating segments having the formulae

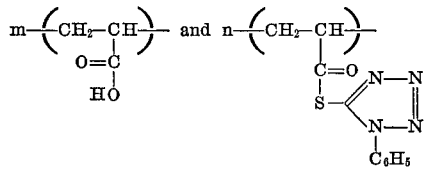

wherein the ratio of the values of m to n is about 4:1.

8. A composition comprising a photographic silver halide emulsion containing a fog-stabilizing amount of the high molecular weight long chain polymer having the formula of claim 5 wherein said repeating segments have the formula

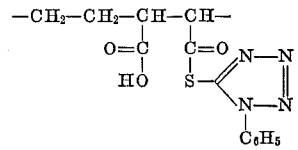

9. A composition comprising a photographic silver halide emulsion containing a fog-stabilizing amount of the high molecular weight long chain polymer having the formula of claim 5 wherein said repeating segments have the formula

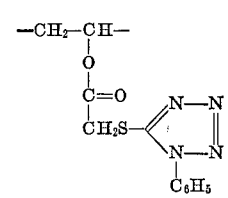

10. A photographic element comprising a support coated with a silver halide layer, said element containing a fog-stabilizing amount of a high molecular weight long chain polymer containing recurring tetrazole moieties.

11. The photographic element of claim 10 wherein said layer is a silver halide emulsion.

12. The photographic element of claim 11 wherein said polymer is present in said silver halide emulsion.

13. The photographic element of claim 11 wherein said polymer is contiguous to said silver halide emulsion.

14. A photographic element comprising a support coated with a silver halide emulsion, said emulsion containing a fog-stabilizing amount of a high molecular weight long chain polymer as defined by claim 5.

References Cited
UNITED STATES PATENTS
2,465,149   3/1949   Dersch et al. _____ 96—109

NORMAN G. TORCHIN, Primary Examiner

J. D. WINKELMAN, Assistant Examiner